(12) United States Patent
Guidotti et al.

(10) Patent No.: US 12,012,476 B2
(45) Date of Patent: Jun. 18, 2024

(54) CATALYST FOR THE POLYMERIZATION OF OLEFINS

(71) Applicant: BASELL POLIOLEFINE ITALIA S.R.L., Milan (IT)

(72) Inventors: Simona Guidotti, Ferrara (IT); Dario Liguori, Ferrara (IT); Giampiero Morini, Ferrara (IT)

(73) Assignee: Basell Poliolefine Italia S.r.l., Milan (IT)

(*) Notice: Subject to any disclaimer, the term of this patent is extended or adjusted under 35 U.S.C. 154(b) by 238 days.

(21) Appl. No.: 17/780,177

(22) PCT Filed: Nov. 28, 2020

(86) PCT No.: PCT/EP2020/083815
§ 371 (c)(1),
(2) Date: May 26, 2022

(87) PCT Pub. No.: WO2021/110563
PCT Pub. Date: Jun. 10, 2021

(65) Prior Publication Data
US 2023/0002516 A1    Jan. 5, 2023

(30) Foreign Application Priority Data
Dec. 4, 2019    (EP) .................................... 19213492

(51) Int. Cl.
| | | |
|---|---|---|
| *C08F 4/654* | (2006.01) |
| *C08F 4/649* | (2006.01) |
| *C08F 4/651* | (2006.01) |
| *C08F 10/02* | (2006.01) |
| *C08F 10/06* | (2006.01) |
| *C08F 110/06* | (2006.01) |

(52) U.S. Cl.
CPC .......... *C08F 4/6545* (2013.01); *C08F 4/6495* (2013.01); *C08F 4/651* (2013.01); *C08F 10/06* (2013.01)

(58) Field of Classification Search
None
See application file for complete search history.

(56) References Cited

U.S. PATENT DOCUMENTS

| 3,629,222 A | 12/1971 | Coover, Jr., et al. |
| 2006/0068984 A1 | 3/2006 | Sugano et al. |
| 2017/0283531 A1 | 10/2017 | Zuideveld et al. |

FOREIGN PATENT DOCUMENTS

| CN | 106170500 A | 11/2016 |
| GB | 1574830 A | 9/1980 |

OTHER PUBLICATIONS

International Search Report and Written Opinion Mailed Jan. 29, 2021 (Jan. 29, 2021) For Corresponding PCT/EP2020/083815.

*Primary Examiner* — Catherine S Branch

(57) ABSTRACT

A catalyst for the polymerization of olefins made from or containing (a) a solid catalyst component containing Mg, Ti and optionally an internal electron donor compound (ID), (b) an aluminum alky compound, and (c) an external electron donor (ED) selected from non-aromatic diazo compounds.

15 Claims, No Drawings

CATALYST FOR THE POLYMERIZATION OF OLEFINS

This application is the U.S. National Phase of PCT International Application PCT/EP2020/083815, filed Nov. 28, 2020, claiming benefit of priority to European Patent Application No. 19213492.2, filed Dec. 4, 2019, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to Ziegler-Natta catalysts for the polymerization of olefins.

BACKGROUND OF THE INVENTION

In some instances, catalyst components are used for the stereospecific polymerization of olefins. In some instances, Ziegler-Natta catalysts made from or containing a solid catalyst component, constituted by a magnesium dihalide on which are supported a titanium compound and, optionally, an internal electron donor compound, are used with an Al-alkyl compound, for polymerizing propylene.

In the preparation of isotactic polypropylene, an external donor increases catalyst stereospecificity.

In some instances, and for ethylene polymerization, ZN catalysts contain ethers as external donors to impart specific properties to the catalysts.

SUMMARY OF THE INVENTION

In a general embodiment, the present disclosure provides nitrogen containing non-aromatic donors for use as external donors for ethylene and propylene polymerization.

In a general embodiment, the present disclosure provides a catalyst for the polymerization of olefins made from or containing (a) a solid catalyst component containing Mg, Ti and optionally an internal electron donor compound (ID), (b) an aluminum alky compound, and (c) an external electron donor (ED) of formula (I)

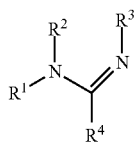

(I)

wherein the $R^1$ to $R^3$ groups, equal to, or different from, each other, are selected from hydrogen or $C_1$-$C_{15}$ hydrocarbon groups, R group is selected from hydrogen, $C_1$-$C_{15}$ hydrocarbon groups, and —$NR_2$ groups, wherein R groups have the same meaning as $R^1$ to $R^3$ groups. In some embodiments, independently, the couples formed by $R^1$-$R^4$ and $R^2$-$R^3$ are joined together to form non-aromatic cyclic structures.

DETAILED DESCRIPTION OF THE INVENTION

In some embodiments, the solid catalyst component (a) contains at least one internal electron donor compound (ID) being a molecule containing at least one functional group selected from the group consisting of esters, ethers, ketones, carbamates, carbonates, amines, amides, nitriles, alkoxysilanes, and mixtures thereof.

In some embodiments, the ID compound is monofunctional or multifunctional. As used herein, the phrase "monofunctional or multifunctional" refers to a molecule containing one or more functional groups. In some embodiments, the multifunctional molecules have functional group belonging to the same or different class.

In some embodiments, and for the polymerization of propylene, the ID contains two or more functional groups selected from the group consisting of esters, ethers, ketones, carbamates, and carbonates.

In some embodiments, the IDs are selected from the group consisting of IDs containing two functional groups (bidentate). In some embodiments, the functional groups for bidentate IDs are selected from the group consisting of alkyl and aryl esters of mono or polycarboxylic acids. In some embodiments, the esters are selected from esters of benzoic, phthalic, malonic, and succinic acid. In some embodiments, the esters are selected from the group consisting of n-butylphthalate, di-isobutylphthalate, di-n-octylphthalate, diethyl 2,2-diisopropylsuccinate, diethyl 2,2-dicyclohexyl-succinate, ethyl-benzoate, p-ethoxy ethyl-benzoate, and diethyl 3,3-di-n-propylglutarate.

In some embodiments, the bidentate IDs are 1,3 diethers of formula (II):

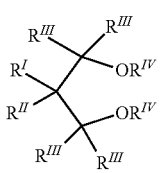

(II)

where $R^I$ and $R^{II}$ are the same or different and are hydrogen or linear or branched $C_1$-$C_{18}$ hydrocarbon groups; $R^{III}$ groups, equal or different from each other, are hydrogen or $C_1$-$C_{18}$ hydrocarbon groups; $R^{IV}$ groups equal or different from each other, have the same meaning of $R^{III}$ except that $R^{IV}$ groups cannot be hydrogen. In some embodiments, $R^I$ or $R^{II}$ has constituents of cyclic structures. In some embodiments, each of $R^I$ to $R^{IV}$ groups contains heteroatoms selected from halogens, N, O, S and Si.

In some embodiments, $R^{IV}$ is a 1-6 carbon atom alkyl radical, alternatively a methyl. In some embodiments, the $R^{III}$ radicals are hydrogen. In some embodiments, $R^I$ and $R^{II}$ are joined to form cyclic structure as described in European Patent Publication No. EP728769A1.

In some embodiments, mixtures of 1,3-diethers are used in the solid catalyst component. In some embodiments, the internal electron donor is selected from the group of mixtures of esters of aliphatic dicarboxylic acids with the 1,3-diethers of formula (II). In some embodiments, the esters of aliphatic dicarboxylic acids are selected from the group consisting of malonates, succinates, and glutarates. In some embodiments, the 1,3-diethers of formula (II) are as described in Patent Cooperation Treaty Publication No. WO2012/139897.

In some embodiments, the bidentate IDs are dicarbamates having formula (III):

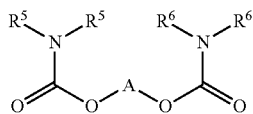
(III)

where $R^5$ and $R^6$, independently, are selected from hydrogen and $C_1$-$C_{15}$ hydrocarbon groups, optionally contain a heteroatom selected from halogen, P, S, N, O, and Si and A is a bivalent bridging group. In some embodiments, $R^5$ and $R^6$ are fused together to form one or more cycles.

In some embodiments, the dicarbamate structures of formula (III) are as described in Patent Cooperation Treaty Publication No. WO2014048861, incorporated herein by reference.

In some embodiments, and for the polymerization of ethylene, the IDs are monofunctional IDs. In some embodiments, the monofunctional IDs are selected from the group consisting of $C_1$-$C_8$ alkyl esters of aliphatic mono carboxylic acids. In some embodiments, the $C_1$-$C_8$ alkyl esters of aliphatic mono carboxylic acids are selected from the group consisting of ethylacetate, methyl formiate, ethylformiate, methylacetate, propylacetate, i-propylacetate, n-butylacetate, and i-butylacetate. In some embodiments, the $C_1$-$C_8$ alkyl ester of an aliphatic mono carboxylic acid is ethylactetate.

In some embodiments, the monofunctional IDs are selected from the group consisting of $C_2$-$C_{20}$ aliphatic ethers, alternatively cyclic ethers, alternatively having 3-5 carbon atoms. In some embodiments, the monofunctional IDs are selected from the group consisting of tetrahydrofuran and dioxane. In some embodiments, the monofunctional IDs are selected from the group consisting of linear $C_2$-$C_{20}$ aliphatic ethers. In some embodiments, the monofunctional IDs are linear $C_2$-$C_{20}$ aliphatic ethers selected from the group consisting of dimethyl ether, diethyl ether and isoamyl ether.

In some embodiments, two or more monofunctional IDs are present in the solid catalyst component (a). In some embodiments, a first ID is selected from aliphatic ethers and a second ID is selected from aliphatic acid esters. In some embodiments, the aliphatic ether is tetrahydrofuran, and the aliphatic acid ester is ethyl acetate. In some embodiments, the molar ratio between the aliphatic acid ester and the ether in the final solid catalyst component ranges from 0.2:1 to 16:1, alternatively from 0.5:1 to 10:1.

In some embodiments, the amount of magnesium present in the solid catalyst component ranges from 5 to 25% wt, alternatively from 13 to 21% wt, based upon the total weight of the solid catalyst component.

In some embodiments, the amount of chlorine present in the solid catalyst component is greater than 30% wt, alternatively greater than 40%, alternatively ranging from 40 to 80% wt., with respect to the total weight of the catalyst component In some embodiments, the amount of titanium atoms present in the solid catalyst component is greater than 1%, alternatively greater than 1.5% wt, alternatively ranges from 1.5 to 6% wt, with respect to the total weight of the solid catalyst component.

In some embodiments, the ID is present in the solid catalyst component in an amount ranging from 1 to 30% by weight, alternatively from 3 to 20% by weight, with respect to the total weight of the solid catalyst component.

In some embodiments, the molar ratio of the ID with respect to the Ti atoms ranges from 0.2:1 to 15:1, alternatively from 0.5:1 to 13:1.

In some embodiments, and in the ED of formula (I), $R^1$ is selected from $C_1$-$C_{15}$ hydrocarbon groups.

In some embodiments, and in the external donor ED of formula (I), $R^1$ and $R^2$ are selected from $C_1$-$C_{10}$, alternatively $C_1$-$C_5$, alkyl groups; $R^3$ is selected from hydrogen or $C_1$-$C_5$ alkyl groups, and $R^4$ is selected from —$NR_2$ groups. In some embodiments, R is selected from hydrogen or $C_1$-$C_5$ alkyl groups. In some embodiments, the external donor (ED) is selected from the group consisting of 1,1-dipropylguanidine, 1-ethyl-1-propylguanidine, 1-methyl-1-propylguanidine, 1-butyl-1-propylguanidine, 1-ethyl-1-methylguanidine, 1,1-dimethylguanidine, 1-butyl-1-methylguanidine, 1,1-diethylguanidine, 1-butyl-1-ethylguanidine, 1,1-dibutylguanidine, 1-butyl-3,3-dimethyl-1-propylguanidine, 1-butyl-1-ethyl-3,3-dimethylguanidine, 1-butyl-1,3,3-trimethylguanidine, 1,1-dibutyl-3,3-dimethylguanidine, 1-butyl-3,3-diethyl-1-propylguanidine, 1-butyl-1,3,3-triethylguanidine, 1-butyl-3,3-diethyl-1-methylguanidine, 1,1-dibutyl-3,3-diethylguanidine, 1-ethyl-3,3-dimethyl-1-propylguanidine, 1,1,3-triethyl-3-propylguanidine, 1,1-diethyl-3,3-dimethylguanidine, 1-ethyl-1,3,3-trimethylguanidine, 1,1,3,3-tetraethylguanidine, 1,1,3,3-tetramethylguanidine, 1,1,3-triethyl-3-methylguanidine, 1,1,3-trimethyl-3-propylguanidine, 1,1-diethyl-3-methyl-3-propylguanidine, 1,1-diethyl-3,3-dimethylguanidine, 1,1-dimethyl-3,3-diproylguanidine, and 1,1-diethyl-3,3-dipropylguanidine]. In some embodiments, the external donor (ED) is 1,1,3,3-tetramethyl guanidine (TMG).

In some embodiments, the ED of formula (I) is coupled with solid catalyst component (a) made from or containing a difunctional ID.

In some embodiment, and in the external donor ED of formula (I), the couples of $R^1$-$R^4$ and $R^2$-$R^3$ are joined together to form non-aromatic ring structures. In some embodiments, the couples of $R^1$-$R^4$ and $R^2$-$R^3$ are joined to form ring structures. In some embodiments, the rings are made of five or more members. In some embodiments, the couple $R^1$-$R^4$ forms a 5-7 members saturated ring structure, and the couple $R^2$-$R^3$ forms a six-member unsaturated ring, having a C=N double bond. In view of the backbone of the ED of formula (I), when the couples of $R^1$-$R^4$ and $R^2$-$R^3$ are joined together to form non-aromatic cyclic structures, EDs having fused heterocyclic rings are obtained. In some embodiments, the ED of formula (I) is selected from the group consisting of 2,5,6,7-tetrahydro-3H-pyrrolo[1,2-a]imidazole, 2,3,5,6,7,8-hexahydroimidazo[1,2-a]pyridine, 2,5,6,7,8,9-hexahydro-3H-imidazo[1,2-a]azepine, 2,3,4,6,7,8,9,10-octahydropyrimido[1,2-α]azepine, 1.8-diazabicyclo[5.4.0]undec-7-ene, 3,4,6,7,8,9-hexahydro-2H-pyrido[1,2-α]pyrimidine, 1,5-diazabicyclo[4.3.0]non-5-ene], and 2,3,4,6,7,8-hexahydropyrrolo[1,2-α]pyrimidine. In some embodiments, the ED of formula (I) is selected from the group consisting of 1.8-diazabicyclo[5.4.0]undec-7-ene (DBU) and 1,5-diazabicyclo[4.3.0]non-5-ene (DBN).

In some embodiments, the ED of formula (I) is coupled with solid catalyst component (a) further made from or containing a monofunctional ID.

In some embodiments, the solid catalyst components (a) are made from or containing a titanium compound, having at least a Ti-halogen bond. In some embodiments, the solid catalyst components (a) are made from or containing a titanium compound, having at least a Ti-halogen bond supported on a Mg halide and an ID compound. In some embodiments, the magnesium halide is $MgCl_2$ in active form. In some embodiments, $MgCl_2$ in active form is a support for Ziegler-Natta catalysts as described in U.S. Pat. Nos. 4,298,718 and 4,495,338.

In some embodiments, the titanium compounds are selected from the group consisting of $TiCl_4$ and $TiCl_3$. In some embodiments, the titanium compounds are selected from the group consisting of Ti-haloalcoholates of formula $Ti(OR^6)_{m-y}X_y$, wherein m is the valence of titanium, y is a number between 1 and m−1, X is halogen, and $R^6$ is a hydrocarbon radical having from 1 to 10 carbon atoms.

In some embodiments, the solid catalyst component is prepared by a reaction between magnesium alcoholates or chloroalcoholates and an excess of $TiCl_4$, in the presence of the electron donor compounds, at a temperature of about 80 to 120° C. In some embodiments, the chloroalcoholates are prepared as described in U.S. Pat. No. 4,220,554.

In some embodiments, the solid catalyst component is prepared by reacting a titanium compound of formula $Ti(OR^7)_{m-y}X_y$, wherein m is the valence of titanium and y is a number between 1 and m, with a magnesium chloride deriving from an adduct of formula $MgCl_2 \cdot pR^8OH$, wherein p is a number between 0.1 and 6, alternatively from 2 to 3.5, and $R^8$ is a hydrocarbon radical having 1-18 carbon atoms. In some embodiments, the titanium compound of formula $Ti(OR^7)_{m-y}X_y$ is $TiCl_4$. In some embodiments, the adduct is prepared in spherical form by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. In some embodiments, the procedure for the preparation of the spherical adducts are as described in U.S. Pat. Nos. 4,399,054 and 4,469,648. In some embodiments, the adduct is directly reacted with Ti compound or subjected to thermal controlled dealcoholation (80-130° C.), thereby obtaining an adduct wherein the number of moles of alcohol is lower than 3, alternatively between 0.1 and 2.5. In some embodiments, the reaction with the Ti compound is carried out by suspending the adduct (dealcoholated or as such) in cold $TiCl_4$. In some embodiments, cold $TiCl_4$ is at about 0° C. In some embodiments, the mixture is heated up to 80-130° C. and maintained at this temperature for 0.5-2 hours. In some embodiments, the treatment with $TiCl_4$ is carried out one or more times. In some embodiments, the electron donor compound is added during the treatment with $TiCl_4$. In some embodiments, the preparation of catalyst components in spherical form is as European Patent Applications Nos. EP-A-395083, EP-A-553805, EP-A-553806, and EPA601525 and Patent Cooperation Treaty Publication No. WO98/44009.

In some embodiments, in a first step (i) carried out at a temperature ranging from 0 to 150° C., a Mg based compound is reacted with a Ti compound, having at least a Ti—Cl bond, in an amount such that the Ti/Mg molar ratio is greater than 3, thereby generating an intermediate solid catalyst component containing Mg and Ti In some embodiments, the Mg based compound is from an adduct of formula $MgCl_2 \cdot pR^8OH$. In some embodiments, in a step (ii), the intermediate solid catalyst component is contacted with an electron donor compound ID.

In some embodiments, the solid catalyst components show a surface area (by B.E.T. method) between 20 and 500 $m^2/g$, alternatively between 50 and 400 $m^2/g$, and a total porosity (by B.E.T. method) higher than 0.2 $cm^3/g$, alternatively between 0.2 and 0.6 $cm^3/g$. In some embodiments, the porosity (Hg method) due to pores with radius up to 10.000 Å ranges from 0.15 to 1.5 $cm^3/g$, alternatively from 0.25 to 1 $cm^3/g$.

In some embodiments, the solid catalyst component has an average particle size ranging from 5 to 120 μm, alternatively from 10 to 100 μm.

In some embodiments, the alkyl-Al compound (b) is a trialkyl aluminum compound. In some embodiments, the trialkyl aluminum compounds are selected from the group consisting of triethylaluminum, triisobutylaluminum, tri-n-butylaluminum, tri-n-hexylaluminum, and tri-n-octylaluminum. In some embodiments, the alkyl-Al compound (b) is selected from alkylaluminum halides, alkylaluminum hydrides, alkylaluminum sesquichlorides, and mixtures with trialkylaluminums. In some embodiments, the alkylaluminum sesquichlorides is $AlEt_2Cl$ or $Al_2Et_3C_3$.

In some embodiments, the ED electron donor compound of formula (I) is used in such an amount to give a molar ratio between the organoaluminum compound and the ED of from 0.1 to 500, alternatively from 1 to 300, alternatively from 3 to 100.

In some embodiments, the present disclosure provides a process for the homopolymerization or copolymerization of olefins $CH_2$=CHR, wherein R is hydrogen or a hydrocarbyl radical with 1-12 carbon atoms, carried out in the presence of the catalyst.

In some embodiments, the polymerization process is carried out with slurry polymerization using as diluent an inert hydrocarbon solvent or bulk polymerization using the liquid monomer as a reaction medium. In some embodiments, the liquid monomer is propylene. In some embodiments, the polymerization process is carried out in gas-phase operating in one or more fluidized or mechanically agitated bed reactors.

In some embodiments, the polymerization is carried out at temperature of from 20 to 120° C., alternatively from 40 to 80° C. In some embodiments, the polymerization is carried out in gas-phase with the operating pressure between 0.5 and 5 MPa, alternatively between 1 and 4 MPa. In some embodiments, the is carried out bulk polymerization with the operating pressure ranges between 1 and 8 MPa, alternatively between 1.5 and 5 MPa.

The following examples are given to further illustrate the disclosure without being intended as limiting the disclosure.

Characterizations

Determination of X.I.

2.5 g of polymer and 250 ml of o-xylene were placed in a round-bottomed flask provided with a cooler and a reflux condenser and kept under nitrogen. The mixture was heated to 135° C. and kept under stirring for about 60 minutes. The final solution was cooled to 25° C. under continuous stirring. The insoluble polymer was then filtered. The filtrate was then evaporated in a nitrogen flow at 140° C. to reach a constant weight. The content of the xylene-soluble fraction is expressed as a percentage of the original 2.5 grams and then, by difference, the X.I. %.

Determination of Donors.

The content of electron donor was determined via gas-chromatography. The solid component was dissolved in acidic water. The solution was extracted with ethyl acetate, an internal standard was added, and a sample of the organic phase was analyzed in a gas chromatograph, thereby determining the amount of donor present at the starting catalyst compound.

Melt Flow Rate (MFR)

The melt flow rate MIL of the polymer was determined according to ISO 1133 (230° C., 2.16 Kg)

Determination of Melt Index (MIE, MIF, MIP)

The melt indices were measured at 190° C. according to ASTM D-1238, condition "E" (load of 2.16 kg), "P" (load of 5.0 kg) and "F" (load of 21.6 kg).

The ratio between MIF and MIE is indicated as F/E, while the ratio between MIF and MIP is indicated as F/P.

Determination of Comonomer Content

1-Butene was determined via $^{13}$C NMR analysis.

$^{13}$C NMR spectra were acquired on a Bruker AV-600 spectrometer equipped with cryo-probe, operating at 150.91 MHz in the Fourier transform mode at 120° C.

The peak of the Sδδ carbon (nomenclature according to C. J. Carman, R. A. Harrington and C. E. Wilkes, Macromolecules, 10, 3, 536 (1977)) was used as internal reference at 29.90 ppm. The samples were dissolved in 1,1,2,2-tetrachloroethane-d2 at 120° C. with an 8% wt/v concentration. Each spectrum was acquired with a 90° pulse, 15 seconds of delay between pulses and CPD to remove $^1$H-$^{13}$C coupling. About 512 transients were stored in 32K data points using a spectral window of 9000 Hz.

Assignments of the spectra were made according to J. C. Randal, Macromol. Chem Phys., C29, 201 (1989).

Triad distribution and composition were made starting from relations between peaks and triads described by Kakugo et al. modified to consider overlaps of signals in the spectra.

Triads $$BBB=100T\beta\beta/S$$

$$BBE=100T\beta\delta/S$$

$$EBE=100\ 2B2(EBE)/S$$

$$BEB=100S\beta\beta/S$$

$$BEE=100S\alpha\delta/S$$

$$EEE=100(0.25S\gamma\delta+0.5S\delta\delta)/S$$

Molar Composition $$B=BBB+BBE+EBE$$

$$E=EEE+BEE+BEB$$

Determination of Fraction Soluble in Xylene 2.5 g of polymer and 250 ml of o-xylene were placed in a round-bottomed flask equipped with a cooler and a reflux condenser and kept under nitrogen. The resulting mixture was heated to 135° C. and kept under stirring for about 60 minutes. The final solution was cooled to 25° C. under continuous stirring. The insoluble polymer was then filtered. The filtrate was then evaporated in a nitrogen flow at 140° C. to reach a constant weight. The content of the xylene-soluble fraction is expressed as a percentage of the original 2.5 grams.

Determination of Effective Density

Effective density: ASTM-D 1505-10 but referred to MI"E" 1 g/10' as corrected by the following equation: density (MIE=1)=density(measured)−0.0024 ln(MI E).

EXAMPLES

General Procedure for the Polymerization of Propylene

A 4-liter steel autoclave equipped with a stirrer, pressure gauge, thermometer, catalyst feeding system, monomer feeding lines, and thermostatic jacket, was purged with nitrogen flow at 70° C. for one hour. Then, at 30° C. under propylene flow, were charged in sequence with 75 mL of anhydrous hexane, 0.76 g of AlEt$_3$, the external electron donor, thereby providing an Al/Donor molar ratio of 20, and 0.006÷0.010 g of solid catalyst component. The autoclave was closed. Then, 2.0 NL of hydrogen were added. Then, under stirring, 1.2 kg of liquid propylene were fed. The temperature was raised to 70° C. in five minutes. The polymerization was carried out at this temperature for two hours. At the end of the polymerization, the unreacted propylene was removed. The polymer was recovered and dried at 70° C. under vacuum for three hours. Then, the polymer was weighed and fractionated with o-xylene, thereby determining the amount of the xylene insoluble (X.I.) fraction. Polymer characteristics are reported in Table 3.

General Procedure for the LLDPE Polymerization Test in Slurry

A 4.5-liter stainless-steel autoclave equipped with a magnetic stirrer, temperature, pressure indicator, and feeding line for ethylene, propane, 1-butene, and hydrogen, and a steel vial for the injection of the catalyst, was purified by fluxing pure nitrogen at 70° C. for 60 minutes. The autoclave was then washed with propane, heated to 75° C., and finally loaded with 800 grams of propane, 1-butene (in the amount variable between 160 g and 200 g), ethylene (7.0 bar, partial pressure), and hydrogen (1.5 bar, partial pressure). In a separate 100 cm$^3$ round bottom glass flask, 50 cm$^3$ of anhydrous hexane, a cocatalyst mixture solution made from or containing triethyl aluminum/diethyl aluminum chloride (that is, TEA/DEAC 2/1 weight ratio (8.5 mmol of aluminum)), tetrahydrofuran or a compound of formula (I) as external donor (Al/ED molar ratio as indicated in Table 2), and 0.010÷0.020 grams of the solid catalyst component were subsequently introduced. The contents of the round bottom flask were mixed and stirred at room temperature for 10 minutes and then introduced to the reactor through the steel vial by using nitrogen overpressure. Under continuous stirring, the total pressure was maintained constant at 75° C., thereby absorbing 150 g of ethylene, for a maximum time of 2 h by continuous ethylene feeding into the system. At the end of the polymerization, the reactor was depressurized. The temperature was reduced to 30° C. The recovered polymer was dried at 70° C. under a nitrogen flow and weighed. Polymer characteristics are reported in Table 2.

General Procedure for the HDPE Polymerization Test
Polymerizations Conditions for Catalyst A A 4.5-liter stainless-steel autoclave equipped with a magnetic stirrer, temperature and pressure indicator, and a feeding line for hexane, ethylene, and hydrogen, was purified by fluxing pure nitrogen at 70° C. for 60 minutes. Then, a solution of 1550 cm$^3$ of hexane containing 0.1 g of triethyl aluminum (TEA) was introduced at a temperature of 25° C. under nitrogen flow to the autoclave. In a separate 100 cm$^3$ round bottom glass flask, 50 cm$^3$ of anhydrous hexane, 0.4 g of triethyl aluminum (TEA), 0.025 grams of the solid catalyst component, and the amount of external donor reported in Table 1 were introduced. The components were mixed, aged 10 minutes at room temperature, and introduced under nitrogen flow into the reactor. The autoclave was closed. The temperature was raised to 75° C. Hydrogen (4 bars partial pressure) and ethylene (7.0 bars partial pressure) were added. Under continuous stirring, the total pressure was maintained at 75° C. for 120 minutes by feeding ethylene. At the end of the polymerization, the reactor was depressurized. The temperature was reduced to 30° C. The recovered polymer was dried at 40° C. under vacuum and analyzed. Polymer characteristics are reported in Table 1.

Polymerizations Conditions for Catalyst B

The procedure for catalyst A was repeated, except triisobutyl aluminum (TIBA) was used instead of triethyl aluminum (TEA). 0.35 g of TIBA went into autoclave and 0.15 g went into the precontact solution. Furthermore, the polymerization time was 3 h, instead of 2 h Polymer characteristics are reported in Table 1.

General Procedure for the Preparation of the Solid Catalyst Component for the LLDPE Polymerization Test in Slurry An initial amount of microspheroidal $MgCl_2 \cdot 2.8C_2H_5OH$ was prepared according to the method described in Example 2 of Patent Cooperation Treaty Publication No. WO98/44009. The resulting microspheroidal $MgCl_2$-EtOH adduct was subjected to a thermal treatment under nitrogen stream over a temperature range of 50-150° C., thereby reducing the alcohol content. A solid support material containing 28.5% wt of EtOH, having an average particle size of 23 μm, was obtained.

Into a 750 mL four-necked round flask, purged with nitrogen, 500 mL of $TiCl_4$ were introduced at 0° C. Then, at the same temperature, 20 grams of microspheroidal adduct were added under stirring. The temperature was raised to 130° C. and maintained at that temperature for 1 hours. Then, the stirring was discontinued. The solid product was allowed to settle, and the supernatant liquid was siphoned off. A new amount of fresh $TiCl_4$ was added to the flask, thereby reaching the initial liquid volume. The temperature was maintained at 110° C. for 0.5 hour. Again, the solid was allowed to settle, and the liquid was siphoned off.

The solid was then washed three times with anhydrous hexane (250 mL at each washing) at 60° C. and twice at 40° C.

500 mL of anhydrous heptane were added to the solid component and heated under stirring to 50° C. At the same temperature, under stirring, 10.5 ml of THF were added dropwise. The temperature was then raised to 95° C., and the mixture was continuously stirred for 2 hours. Then, the temperature was decreased to 80° C. The stirring was discontinued. The solid product was allowed to settle, and the supernatant liquid was siphoned off.

The solid was washed twice with anhydrous hexane (2×250 mL) at 40° C., recovered, dried under vacuum, and analyzed. The solid showed the following characteristics: Ti=1.85% (by weight), Mg=14.6% (by weight), and tetrahydrofuran=32.6% (by weight).

General Procedure for the Preparation of the Solid Catalyst Component for Propylene Polymerization Test Into a 500 ml round bottom flask, equipped with mechanical stirrer, cooler, and thermometer, 300 ml of $TiCl_4$ were introduced at room temperature under nitrogen atmosphere. After cooling to 0° C., while stirring, 9,9-bis(methoxymethyl)fluorene and 9.0 g of the microspheroidal adduct were sequentially added into the flask. The amount of charged internal donor was such to have a Mg/donor molar ratio of 6. The temperature was raised to 100° C. and maintained for 2 hours. Thereafter, stirring was stopped. The solid product was allowed to settle, and the supernatant liquid was siphoned off at 100° C. After the supernatant was removed, additional fresh $TiCl_4$ was added, thereby reaching the initial liquid volume again. The mixture was then heated at temperature in the range of 110° C. and maintained at this temperature for 1 hour. Stirring was stopped again. The solid was allowed to settle, and the supernatant liquid was siphoned off. The solid was washed with anhydrous hexane six times in temperature gradient down to 60° C. and one time at room temperature. The resulting solid was then dried under vacuum and analyzed. The solid showed the following characteristics: Ti=4.1% (by weight), Mg=13.8% (by weight), and 9,9-bis(methoxymethyl)fluorene=12.6% (by weight).

Example 1-3 and Comparative Examples 1-2

Preparation of Solid Catalyst Component A

A magnesium chloride and alcohol adduct containing about 3 mols of alcohol was prepared following the method described in example 2 of U.S. Pat. No. 4,399,054, but working at 2000 RPM instead of 10000 RPM. The adduct was subjected to a thermal treatment, under nitrogen stream, over a temperature range of 50-150° C. until a weight content of 24.4% of alcohol was reached.

Into a 2 L four-necked round flask, purged with nitrogen, 1 L of $TiCl_4$ was introduced at 0° C. Then, at the same temperature, 70 g of a microspheroidal $MgCl_2$/EtOH adduct containing 24.4% wt of ethanol were added under stirring. The temperature was raised to 130° C. in 2 h and maintained for 90 min. Then, the stirring was discontinued. The solid product was allowed to settle, and the supernatant liquid was siphoned off. A new amount of fresh $TiCl_4$ was added to the flask, thereby reaching the initial liquid volume. The temperature was maintained at 115° C. for 90 minutes. Again, the solid was allowed to settle, and the liquid was siphoned off. The solid was then washed three times with anhydrous iso-hexane (400 mL at each washing) at 60° C. and twice at 40° C.

At the end, the residual solid was suspended in 600 mL of dry iso-hexane. At the same temperature, under stirring, ethyl acetate was added dropwise to have a Mg/donor molar ratio of 1.7.

The temperature was raised to 50° C. The mixture was stirred for 2 hours. Then, the stirring was discontinued. The solid product was allowed to settle, and the supernatant liquid was siphoned off.

The solid was washed twice with anhydrous hexane (2×100 mL) at 40° C., recovered, and dried under vacuum. The solid showed the following characteristics: Ti=2.2% (by weight), Mg=15.3% (by weight), and ethyl acetate=29.3% (by weight). The resulting solid catalyst components were tested in polymerization of ethylene for preparing HDPE. The results are listed in Table 1.

Example 4 and Comparative Examples 3-4

Procedure for the Preparation of the Solid Catalyst Component (B)

A magnesium chloride and alcohol adduct containing about 3 mols of alcohol was prepared following the method described in example 2 of U.S. Pat. No. 4,399,054, but working at 2000 RPM instead of 10000 RPM. The adduct was subjected to a thermal treatment, under nitrogen stream, over a temperature range of 50-150° C. until a weight content of 25% of alcohol was reached.

Into a 2 L four-necked round flask, purged with nitrogen, 1 L of TiCl4 was introduced at 0° C. Then, at the same temperature, 70 g of a microspheroidal $MgCl_2$/EtOH adduct containing 25% wt of ethanol were added under stirring. The temperature was raised to 140° C. in 2 h and maintained for 120 minutes. Then, the stirring was discontinued. The solid product was allowed to settle, and the supernatant liquid was siphoned off. The solid residue was then washed once with heptane at 80° C. and five times with hexane at 25° C. and dried under vacuum at 30° C. The solid showed the following characteristics: Ti=3.0% (by weight) and Mg=8.7% (by weight). The resulting solid catalyst components were tested in polymerization of ethylene for preparing HDPE. The results are listed in Table 1.

TABLE 1

| EX | Catalyst | ED | Al/ED m.r. | Activity Kg/g | MIE g/10' | MIP g/10' | F/P | F/E |
|---|---|---|---|---|---|---|---|---|
| C1 | A | — | — | 10.1 | 1.00 | 3.00 | 11.2 | 33.7 |
| C2 | A | THF | 15 | 9.8 | 0.94 | 2.73 | 9.1 | 26.5 |
| 1 | A | DBU | 15 | 8.0 | 0.44 | 1.24 | 8.5 | 23.9 |
| 2 | A | DBN | 15 | 10.4 | 0.47 | 1.30 | 8.8 | 24.5 |
| 3 | A | DBU | 30 | 9.7 | 0.68 | 2.0 | 8.8 | 25.7 |
| C3 | B | — | — | 21.5 | 0.16 | 0.66 | 13.6 | 56.3 |
| C4 | B | THF | 10 | 13.4 | 0.11 | 0.43 | 12.3 | 48.2 |
| 4 | B | DBU | 30 | 17.2 | 0.19 | 0.74 | 11.6 | 45.3 |

TABLE 2

| EX | ED type | Al/ED m.r. | Activity Kg/g/h | MIE g/10' | $C_4^-$ % wt. | XS % | Density g/cm$^3$ | F/P | F/E |
|---|---|---|---|---|---|---|---|---|---|
| C5 | THF | 5 | 7.1 | 1.18 | 8.7 | 9.8 | 0.919 | 8.9 | 24.9 |
| 5 | DBU | 50 | 4.2 | 1.37 | 8.5 | 9.4 | 0.918 | 8.5 | 23.6 |

TABLE 3

| EX | ED type | Al/ED m.r. | Activity Kg/g | XI % | MIL g/10' |
|---|---|---|---|---|---|
| C6 | none | — | 82.7 | 94.5 | 30.0 |
| 6 | TMG | 20 | 38.9 | 98.5 | 8.40 |

What is claimed is:

1. A catalyst for the polymerization of olefins comprising;
   (a) a solid catalyst component containing Mg, Ti and optionally an internal electron donor compound (ID),
   (b) an aluminum alkyl compound, and
   (c) an external electron donor (ED) of formula (I)

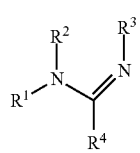

(I)

wherein the $R^1$ to $R^3$ groups, equal to, or different from, each other, are selected from hydrogen or $C_1$-$C_{15}$ hydrocarbon groups, $R^4$ group is selected from hydrogen, $C_1$-$C_{15}$ hydrocarbon groups, and —$NR_2$ groups wherein R groups have the same meaning as $R^1$ to $R^3$ groups.

2. The catalyst according to claim 1, wherein the solid catalyst component (a) contains at least one internal electron donor compound (ID) being a molecule containing at least one functional group selected from the group consisting of esters, ethers, ketones, carbamates, carbonates, amines, amides, nitriles, alkoxysilanes, and mixtures thereof.

3. The catalyst according to claim 1, wherein the ID compound is monofunctional or multifunctional.

4. The catalyst according to claim 3, wherein the ID compound is multifunctional and contains two or more functional groups selected from the group consisting of esters, ethers, ketones, carbamates, and carbonates.

5. The catalyst according to claim 3, wherein the ID compound is monofunctional and contains a functional group selected from the group consisting of $C_1$-$C_8$ alkyl esters of aliphatic mono carboxylic acids and $C_2$-$C_{20}$ aliphatic ethers.

6. The catalyst according to claim 1, wherein $R^1$ is selected from $C_1$-$C_{15}$ hydrocarbon groups.

7. The catalyst according to claim 1, wherein, in the ED compound of formula (I), $R^1$ and $R^2$ are selected from $C_1$-$C_{10}$ alkyl groups, $R^3$ is selected from hydrogen or $C_1$-$C_8$ alkyl groups, and $R^4$ is selected from —$NR_2$ groups.

8. The catalyst according to claim 1, wherein the ED compound of formula (I) is tetra-methyl guanidine.

9. The catalyst according to claim 4, wherein the solid catalyst component (a) comprises a difunctional ID compound.

10. The catalyst according to claim 1, wherein, in the ED compound of formula (I), the couples of R1-R4 and R2-R3 are joined together to form non-aromatic ring structures.

11. The catalyst according to claim 10, wherein the ring structures are made of five or more members.

12. The catalyst according to claim 11, wherein the couple $R_1$-$R^4$ forms a 5-7 members saturated ring structure and the couple $R^2$-$R^3$ forms a six-member unsaturated ring, having a C=N double bond.

13. The catalyst according to claim 1, wherein the ED compound of formula (I) is selected from selected from the group consisting of 1.8-diazabicyclo[5.4.0]undec-7-ene (DBU) and 1,5-diazabicyclo[4.3.0]non-5-ene (DBN).

14. The catalyst according to claim 5, wherein the solid catalyst component (a) comprises a monofunctional ID compound.

15. A process for the homopolymerization or copolymerization of olefins $CH_2$=CHR, wherein R is hydrogen or a hydrocarbyl radical with 1-12 carbon atoms, comprising polymerizing or copolymerizing $CH_2$=CHR in the presence of the catalyst according to claim 1.

* * * * *